(12) United States Patent
Larkins

(10) Patent No.: US 12,317,781 B2
(45) Date of Patent: Jun. 3, 2025

(54) VEGETATION HANGER

(71) Applicant: DriFlower, LLC, Ashland, OR (US)

(72) Inventor: Todd Chandler Larkins, Ashland, OR (US)

(73) Assignee: DRIFLOWER, LLC, Ashland, OR (US)

( * ) Notice: Subject to any disclaimer, the term of this patent is extended or adjusted under 35 U.S.C. 154(b) by 0 days.

(21) Appl. No.: 17/766,802

(22) PCT Filed: Oct. 9, 2020

(86) PCT No.: PCT/US2020/054898
§ 371 (c)(1),
(2) Date: Apr. 6, 2022

(87) PCT Pub. No.: WO2021/072142
PCT Pub. Date: Apr. 15, 2021

(65) Prior Publication Data
US 2024/0065174 A1    Feb. 29, 2024

Related U.S. Application Data

(60) Provisional application No. 62/913,058, filed on Oct. 9, 2019.

(51) Int. Cl.
*A01F 25/12*  (2006.01)
*F26B 7/00*  (2006.01)

(52) U.S. Cl.
CPC ............... *A01F 25/12* (2013.01); *F26B 7/00* (2013.01)

(58) Field of Classification Search
CPC ...... A01G 9/033; A01G 9/0299; A01G 21/00; A01F 25/12; A47G 7/047; A47G 7/042; F26B 7/00; A24B 1/00
See application file for complete search history.

(56) References Cited

U.S. PATENT DOCUMENTS

| | | | |
|---|---|---|---|
| 322,330 A * | 7/1885 | Snow | A43D 117/00 211/209 |
| 941,448 A | 11/1909 | Haglund | |
| 945,729 A | 1/1910 | Rangnow | |
| 1,321,997 A | 11/1919 | Duberstein | |

(Continued)

FOREIGN PATENT DOCUMENTS

| | | |
|---|---|---|
| CA | 2458956 A1 | 9/2004 |
| CN | 201533508 U | 7/2010 |

(Continued)

OTHER PUBLICATIONS

International Search Report and Written Opinion dated Jan. 22, 2021, issued in corresponding international application No. PCT/US2020/054898, 10 pages.

(Continued)

*Primary Examiner* — Ko H Chan
(74) *Attorney, Agent, or Firm* — George Likourezos; Carter, DeLuca & Farrell LLP

(57) ABSTRACT

A vegetation hanger includes a linear plate and an aperture. The linear plate includes a first edge, a second edge, a first end portion, and a second end portion. The first edge includes at least one ridge disposed along the first edge. The aperture is disposed centrally along the linear plate and configured to slidably engage with a bar.

16 Claims, 1 Drawing Sheet

(56) References Cited

U.S. PATENT DOCUMENTS

| | | |
|---|---|---|
| 1,515,078 A | 11/1924 | Sheee |
| 1,833,388 A | 11/1931 | Carmack |
| 1,868,638 A | 7/1932 | Mackey |
| 2,037,971 A * | 4/1936 | Ferren .................... E05B 73/00 |
| | | 70/61 |
| 2,099,596 A | 11/1937 | Bruening |
| 2,150,869 A | 3/1939 | Shafarman |
| 2,279,777 A | 4/1942 | Dean |
| 2,289,729 A | 7/1942 | Robinson et al. |
| 2,411,856 A | 12/1946 | Harding |
| 2,484,449 A | 10/1949 | Fetterman |
| 2,546,929 A | 3/1951 | Nampa |
| 2,580,193 A | 12/1951 | Richterkessing |
| 2,586,913 A | 2/1952 | Burns |
| 2,634,031 A | 4/1953 | Klein |
| 2,671,938 A | 3/1954 | Roberts |
| 2,692,711 A | 10/1954 | Norris et al. |
| 2,716,513 A | 8/1955 | Braunstein |
| 2,828,897 A | 4/1958 | Gordon |
| 2,929,514 A * | 3/1960 | Stewart .................... A47B 61/02 |
| | | 248/317 |
| 3,131,817 A | 5/1964 | Schenkler |
| 3,194,458 A | 7/1965 | Bennett |
| D202,954 S | 11/1965 | Hanson |
| 3,346,150 A | 10/1967 | Clopton |
| D210,333 S | 2/1968 | Apy |
| 3,535,808 A | 10/1970 | Morrish |
| 3,580,386 A * | 5/1971 | Arnould .................... B65G 47/57 |
| | | 198/801 |
| 3,606,948 A | 9/1971 | Strang |
| 3,874,572 A | 4/1975 | McClenning |
| D236,572 S | 9/1975 | Ostroll |
| D264,912 S | 6/1982 | Bliss et al. |
| 4,440,369 A | 4/1984 | Banks |
| 4,494,896 A * | 1/1985 | DiFranco .................... B60P 3/00 |
| | | 410/148 |
| 4,703,878 A | 11/1987 | Louw |
| 4,717,053 A | 1/1988 | Wang |
| 4,724,967 A | 2/1988 | Valiulis |
| 4,793,531 A | 12/1988 | Blanchard et al. |
| 4,811,853 A * | 3/1989 | Mead .................... B65D 85/185 |
| | | 211/124 |
| 4,845,602 A | 7/1989 | Lehocki |
| 4,881,342 A | 11/1989 | Ferguson |
| 5,007,562 A | 4/1991 | Brink et al. |
| 5,074,445 A | 12/1991 | Chen |
| 5,129,524 A * | 7/1992 | Holman .................... A47G 19/16 |
| | | 99/321 |
| D331,425 S | 12/1992 | Rhyne |
| 5,168,642 A * | 12/1992 | Hansen .................... A01F 25/12 |
| | | 34/239 |
| D332,180 S | 1/1993 | Marshall et al. |
| 5,329,728 A | 7/1994 | Ray |
| 5,333,409 A | 8/1994 | Mendes |
| 5,361,949 A | 11/1994 | Petrou |
| 5,388,354 A | 2/1995 | Marshall et al. |
| D357,813 S | 5/1995 | Koresko |
| 5,520,311 A | 5/1996 | Lam |
| 5,535,927 A | 7/1996 | Garrison |
| 5,544,765 A | 8/1996 | Farbman |
| 5,581,936 A | 12/1996 | Belgiorno |
| 5,813,092 A | 9/1998 | Greenfield et al. |
| 5,826,759 A | 10/1998 | Ohsugi |
| 5,868,289 A | 2/1999 | Lee |
| 5,884,422 A | 3/1999 | Marshall et al. |
| 6,047,867 A | 4/2000 | Heiber |
| 6,132,305 A * | 10/2000 | Witherell .................... A22B 5/06 |
| | | 452/192 |
| 6,298,600 B1 | 10/2001 | Feldman |
| 6,340,238 B1 | 1/2002 | Pan |
| 6,349,863 B1 | 2/2002 | Frye |
| 6,389,744 B1 | 5/2002 | Pugh |
| 6,641,105 B1 | 11/2003 | Hamerski |
| 6,659,295 B1 | 12/2003 | De Land et al. |
| 6,811,064 B2 | 11/2004 | Salem |
| 6,817,497 B2 | 11/2004 | Grasso et al. |
| 6,846,177 B1 * | 1/2005 | Hutchens ................ A24B 1/02 |
| | | 432/500 |
| D502,756 S * | 3/2005 | Birdwell ...................... D22/199 |
| 6,863,197 B1 | 3/2005 | Dirlam et al. |
| 7,015,815 B1 | 3/2006 | Feibelman |
| 7,178,705 B1 | 2/2007 | Sutton |
| 7,377,409 B1 | 5/2008 | Brown |
| D578,778 S | 10/2008 | Laino et al. |
| D605,861 S | 12/2009 | Meadows |
| 7,774,977 B2 | 8/2010 | Miller Shelton |
| 7,984,585 B1 | 7/2011 | Wu |
| 8,276,714 B2 | 10/2012 | Broyles |
| D680,757 S | 4/2013 | Hyman et al. |
| D711,123 S | 8/2014 | Birge |
| 9,113,736 B1 | 8/2015 | Antler |
| D772,584 S | 11/2016 | Debus |
| 9,782,031 B2 | 10/2017 | Debus |
| D806,410 S | 1/2018 | Denby et al. |
| D853,737 S | 7/2019 | Wolfe |
| D867,770 S | 11/2019 | Wright |
| 2002/0184799 A1 | 12/2002 | Chou |
| 2004/0226971 A1 | 11/2004 | Detten |
| 2005/0035159 A1 | 2/2005 | Hunt et al. |
| 2005/0139625 A1 | 6/2005 | Gouldson |
| 2005/0189383 A1 | 9/2005 | Weal et al. |
| 2006/0032130 A1 | 2/2006 | Lifers et al. |
| 2006/0226179 A1 | 10/2006 | Hsu |
| 2007/0266627 A1 | 11/2007 | Shelton |
| 2008/0236041 A1 | 10/2008 | Carpenter |
| 2008/0283558 A1 | 11/2008 | Rude et al. |
| 2011/0247185 A1 | 10/2011 | Bolden et al. |
| 2011/0284597 A1 | 11/2011 | Kaleta et al. |
| 2012/0112425 A1 * | 5/2012 | Hickey ...................... B62B 3/10 |
| | | 280/79.3 |
| 2012/0132679 A1 | 5/2012 | Gouldson |
| 2013/0015215 A1 | 1/2013 | Coote |
| 2013/0221041 A1 | 8/2013 | Wittenstein et al. |
| 2014/0246464 A1 | 9/2014 | Zhong |
| 2014/0367425 A1 | 12/2014 | Laibe |
| 2015/0075129 A1 * | 3/2015 | Mooneyhan ............ A24B 1/02 |
| | | 34/201 |
| 2015/0230632 A1 * | 8/2015 | Cantwell ................ A47F 5/0807 |
| | | 211/124 |
| 2016/0058210 A1 | 3/2016 | Strassburger et al. |
| 2016/0223137 A1 | 8/2016 | Ochipa |
| 2017/0105362 A1 | 4/2017 | Irving, Jr. |
| 2017/0238731 A1 | 8/2017 | Davies |
| 2017/0325614 A1 | 11/2017 | Baltz |
| 2018/0087293 A1 | 3/2018 | Strassburger et al. |
| 2018/0103785 A1 | 4/2018 | Goldman et al. |
| 2018/0160833 A1 | 6/2018 | Ho |
| 2018/0303263 A1 | 10/2018 | Jones et al. |
| 2018/0317685 A1 | 11/2018 | Boles |
| 2018/0325299 A1 | 11/2018 | Clark et al. |
| 2018/0356028 A1 | 12/2018 | Fang |
| 2019/0014936 A1 | 1/2019 | Beyda et al. |
| 2019/0270466 A1 * | 9/2019 | Flow ........................ B62B 3/004 |
| 2019/0307264 A1 | 10/2019 | Carr et al. |
| 2019/0380522 A1 | 12/2019 | Johansson |
| 2020/0085221 A1 | 3/2020 | Riedel et al. |
| 2020/0128988 A1 | 4/2020 | Moore et al. |
| 2020/0245796 A1 | 8/2020 | Gilbert |

FOREIGN PATENT DOCUMENTS

| | | |
|---|---|---|
| CN | 104621238 A | 5/2015 |
| CN | 105474854 A | 4/2016 |
| CN | 205667333 U | 11/2016 |
| CN | 206611910 U | 11/2017 |
| CN | 107896731 A | 4/2018 |
| CN | 208864010 U | 5/2019 |
| DE | 3246174 C2 | 1/1994 |
| FR | 2464638 A1 | 3/1981 |
| FR | 3062120 A1 | 7/2018 |
| JP | 2008092939 A | 4/2008 |
| JP | 4218802 B2 | 2/2009 |

(56) References Cited

FOREIGN PATENT DOCUMENTS

| | | |
|---|---|---|
| JP | 4399093 B2 | 1/2010 |
| JP | 2011010890 A | 1/2011 |
| KR | 20-2005-0002675 A | 1/2005 |
| KR | 2003821320000 Y1 | 4/2005 |
| KR | 2011 0029352 A | 3/2011 |
| KR | 101071670 B1 | 10/2011 |
| KR | 2012 0131010 A | 12/2012 |
| KR | 2017 0067056 A | 6/2017 |
| KR | 20170079314 A | 7/2017 |
| KR | 101938225 B1 | 1/2019 |
| WO | 2018150157 A1 | 8/2018 |

OTHER PUBLICATIONS

International Search Report and Written Opinion dated Jan. 22, 2021, issued in corresponding international application no. PCT/US2020/054898, 10 pages. Patentability and Written Opinion issued by the European Patent Office in No. PCT/US2020/054898, dated Apr. 12, 2022.

International Preliminary Report on Patentability and Written Opinion issued by the European Patent Office in cnnection with International Application No. PCT/US2020/054898, dated Apr. 12, 2022. Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-hanging-herb-dryer/.

International Search Report and Written Opinion for Application No. PCT/US2020/042261 dated Nov. 2, 2020.

International Preliminary Report on Patentability issued in corresponding international application No. PCT/US2020/053426, Apr. 5, 2022, 6 pages.

Canadian Examination Report issued in related Canadian Patent Application No. 3,155,364 (5 pages).

Canadian Examination Report issued by the Canadian Patent Office in connection with International Application No. 3,147,595, dated May 6, 2024.

Chinese Office Action issued by the State Intellectual Property Office of People's Republic of China in connection with International Application No. 2020800064670.3, pp. 1-7, dated Mar. 1, 2023.

Chinese Office Action issued by the State Intellectual Property Office of People's Republic of China in connection with International Application No. 2020800064670.3, pp. 1-3, dated Oct. 10, 2023.

Canadian Examiners Report issued by the Canadian Patent Office in connection with International Application No. 3,147,595, dated Oct. 26, 2023.

European Examination Report issued by the European Patent Office in connection with International Application No. 20 751 012.4, dated Oct. 14, 2024.

Chinese Decision of Rejection issued by the Chinese Patent Office in connection with International Application No. 202080064670.3, pp. 1-12, dated Feb. 23, 2024.

\* cited by examiner

VEGETATION HANGER

CROSS-REFERENCE TO RELATED APPLICATIONS

This application is a National Stage Application of PCT International Application No.: PCT/2020/054898 under 35 U.S.C. § 371(a), filed Oct. 9, 2020, which claims the benefit of, and priority to, U.S. Provisional Patent Application No. 62/913,058, filed on Oct. 9, 2019, the entire contents of each of which are hereby incorporated herein by reference.

FIELD

The present disclosure generally relates to a hanger and more particularly, to a hanger for facilitating hang harvesting, transportation, drying and unloading of vegetation.

BACKGROUND

Vegetation, such as plants, herbs, flowers, hemp and/or *cannabis*, and other vegetation, are harvested, and then subsequently dried to produce a final product. Typically, during the drying process, vegetation is hung on plastic netting, which causes stress to the user and damages vegetation. This process requires the vegetation to be hung one branch at time and threaded through the netting to secure the vegetation. Removal of the vegetation also requires careful unthreading of the vegetation one branch at a time from the plastic netting. Other methods have been contemplated, such as clothing hangers, bailing wires, string and/or ropes, screens, chains, cages, fencing, and combinations thereof, all of which cause damage to vegetation and stress to the user. Therefore, there is a need to provide a method of facilitating hang harvesting, transporting, drying and unloading of without damaging the vegetation.

SUMMARY

The present disclosure relates to a hanger that includes a hanger portion and a crossbar coupled to the hanger portion to create a vegetation hanger to facilitate facilitating hang harvesting, transportation, drying and unloading of vegetation.

In one aspect, the present disclosure provides a vegetation hanger including a linear plate and an aperture. The linear plate has a first edge, a second edge, a first end portion, and a second end portion. The first edge includes at least one ridge disposed along the first edge. The aperture is disposed centrally along the linear plate and configured to slidably engage with a bar.

In aspects, the second edge of the linear plate may be bent at a predetermined angle relative to the crossbar.

In aspects, the predetermined angle may be 90 degrees.

In aspects, the first and second end portions of the linear plate each may include a lip.

In aspects, the linear plate may be tapered from a center point between the first and second end portions outwardly towards the first and second end portion.

In aspects, the vegetation hanger may be formed from one or more materials selected from metal, plastic, or composite materials.

In another aspect, the present disclosure provides a method of drying vegetation on a vegetation hanger. The method includes sliding a vegetation hanger includes onto a bar; hanging the vegetation on a first edge of a crossbar having at least one ridge disposed on the first edge; and carrying, via the bar, the vegetation from a first location to a second location.

In aspects, carrying the vegetation hanger to transport the vegetation may include transporting the vegetation from a point of harvest to a final drying location.

DETAILED DESCRIPTION

Figure 1:
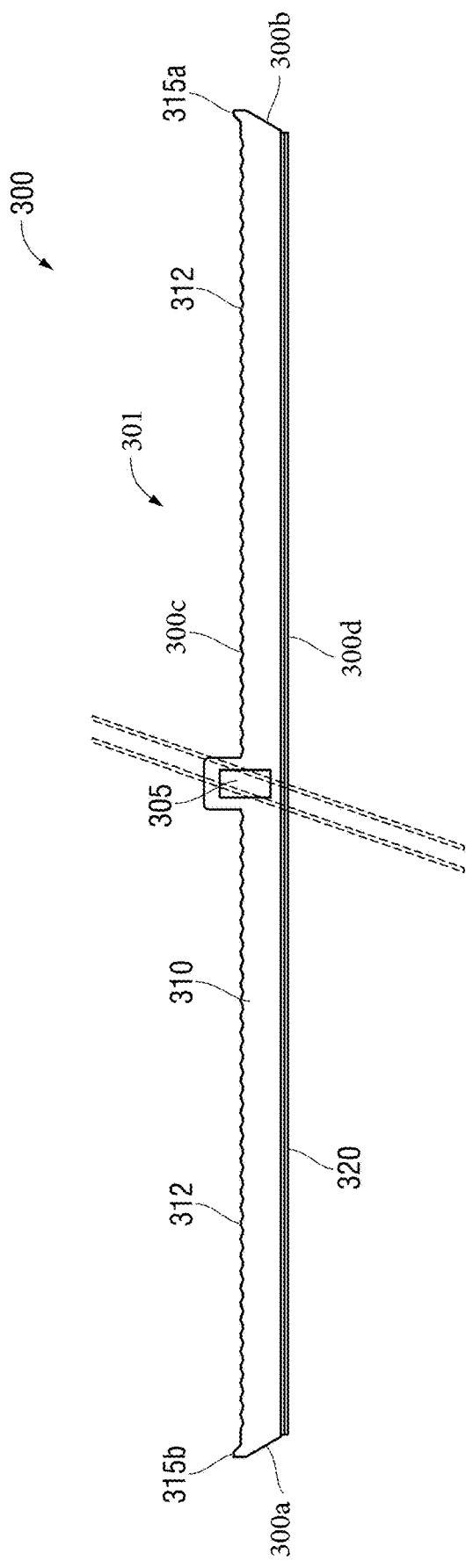
FIG. 1 is a front view of a vegetation hanger in accordance with the present disclosure.

Embodiments of the presently disclosed vegetation hanger are described in detail with reference to the drawings, in which like reference numerals designate identical or corresponding elements in each of the several views.

Referring to FIG. 1, a vegetation hanger provided in accordance with the present disclosure is shown generally identified by reference numeral 1. The vegetation hanger 1 generally includes a crossbar 300. The crossbar 300 includes a linear portion 310 and an aperture 305. The aperture 305 is disposed centrally along the linear portion 310 and configured to slidably engage a pole or horizontal bar. The linear plate 301 is configured to facilitate the hanging of vegetation thereon. The linear plate 301 includes a first end portion 300a and second end portion 300b, a top edge 300c, and bottom edge 300d. At least a portion of top edge 300c of the linear plate 301 includes at least one ridge, or alternatively as shown, serrated or textured surface including a series or plurality of ridges 312, disposed along the top edge 300c. The series of ridges are configured to prevent vegetation from sliding off the crossbar 300 and provide organization of the vegetation on the series of ridges 312. The linear plate 301 includes one or more lips 315a, 315b disposed on the first and second end portions 300a, 300b, respectively. The lips 315a, 315b are configured to prevent unintended lateral movement of the vegetation off the first and second end portion 300a, 300b. When intended, lateral movement of all the vegetation hung on the crossbar 300 at once may be initiated by a user. The crossbar 300 may be fabricated from a lightweight powdered metal, plastic, composite material, or any other suitable material. The aperture 305 is further configured to receive a zip tie or any suitable fasteners and the linear portion 310 is configured to receive a label disposed along the linear portion 310, in which both zip tie and the label contains harvest information such as, for example, name of harvest, strain, and/or date and time of harvest, in order to facilitate labeling of the harvest.

Figure 2:
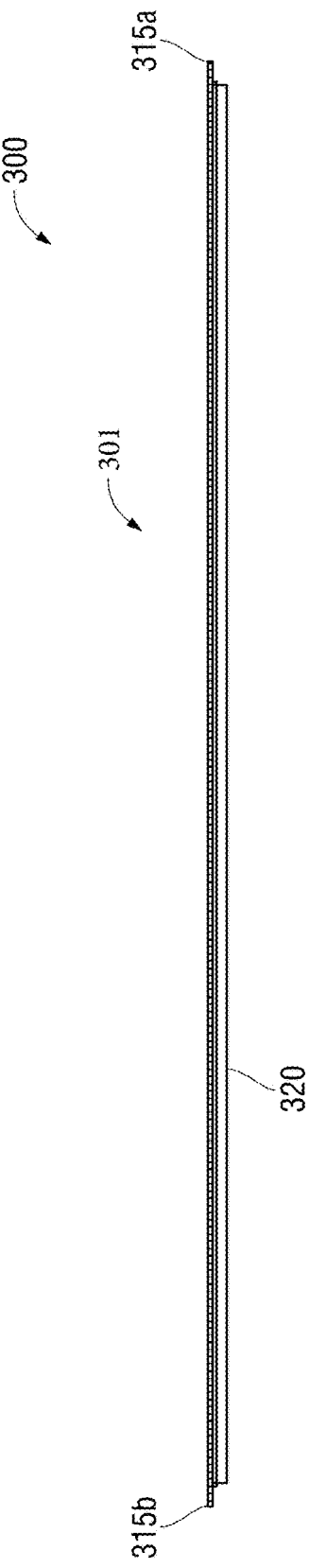
FIG. 2 is a top view of the hanger portion of the hanger of FIG. 1.

With additional reference to FIG. 2, the bottom edge 300d is configured to be bent to a predetermined angle such as, for example, 90 degrees, relative to the linear plate 301 to provide additional strength to the linear plate 301 in carrying vegetation on the linear plate 301. A bent portion of the bottom edge 300d may define a base 320.

The linear plate 301 may be fabricated at any suitable length, which, as non-limiting examples, may be one of 21", 41", or 61" to accommodate different open spaces, amount of vegetation to be dried, and support of vegetation within a drying system. The vegetation hanger 1 may be configured to be flat providing a minimal thickness to allow for stacking and storage of multiple vegetation hanger(s). Alternatively, the linear plate 301 may be configured to be tapered in two directions from a center point between the first end portion 300a and the second end portion 300b outwardly towards each of the first end portion 300a and the second end portion 300b.

In operation to dry vegetation, the vegetation hanger(s) 1, including the crossbar 300, is slidably engaged with the pole or horizontal bar at the point of harvest. The vegetation may be cut (e.g., to about 24" in length) and hung along the top edge 300c of the crossbar 300. Each piece of harvested vegetation can be placed between adjacent ridges of the series of ridges 312 to prevent individual movement of the vegetation. Once all the vegetation has been placed on the crossbar 300 of vegetation hanger 1, the vegetation hanger 1 may be carried (e.g., by a user) via the pole or horizontal bar from the point of harvest to the final drying location.

While several embodiments of the disclosure have been detailed above and are shown in the drawings, it is not intended that the disclosure be limited thereto, as it is intended that the disclosure be as broad in scope as the art will allow and that the specification be read likewise. Therefore, the above description and accompanying drawings should not be construed as limiting, but merely as exemplifications of particular embodiments. Those skilled in the art will envision other modifications within the scope and spirit of the claims appended hereto.

What is claimed is:

1. A vegetation hanger, comprising:
   a linear plate of a crossbar having a first edge, a second edge, a first end portion, and a second end portion, wherein the first edge is a serrated surface configured to facilitate stationary hanging and organization of vegetation on the crossbar and includes at least one ridge disposed along the first edge upon which vegetation is hung; and
   an aperture disposed centrally along the linear plate and configured to slidably engage with a bar, wherein the linear plate further comprises a protrusion including a first edge extending beyond the first edge of the linear plate, and wherein the aperture is defined within the protrusion, and wherein the aperture is disposed between the first edge of the protrusion and the second edge of the linear plate,
   wherein a portion of the second edge of the linear plate is bent at a predetermined angle relative to the crossbar, and wherein the bent portion of the second edge extends along an entire length of the crossbar between the first end portion and the second end portion.

2. The vegetation hanger according to claim 1, wherein the predetermined angle is 90 degrees.

3. The vegetation hanger according to claim 1, wherein the first and second end portions of the linear plate each includes a lip.

4. The vegetation hanger according to claim 1, wherein the linear plate is tapered from a center point between the first and second end portions outwardly towards the first and second end portion.

5. The vegetation hanger according to claim 1, wherein the vegetation hanger is formed from one or more materials selected from metal, plastic, or composite materials.

6. A method of drying vegetation on at least one vegetation hanger, the method comprising:
   providing the vegetation hanger comprising a linear plate of a crossbar having a first edge and a second edge;
   providing an aperture disposed centrally along the linear plate and configured to slidably engage with a bar, wherein the linear plate further comprises a protrusion including a first edge, wherein the first edge of the protrusion extends beyond the first edge of the linear plate and wherein the aperture is defined within the protrusion;
   sliding the vegetation hanger onto a horizontal bar;
   cutting vegetation into strips;
   hanging the strips of cut vegetation on the first edge of the linear plate of the vegetation hanger; and
   carrying, via the horizontal bar, the strips of cut vegetation from a first location to a second location.

7. The method according to claim 6, wherein carrying the strips of cut vegetation from the first location to the second location includes transporting the vegetation hanger from a point of harvest to a final drying location.

8. The vegetation hanger according to claim 1, wherein the aperture is centrally disposed between the first edge of the protrusion and the second edge of the linear plate.

9. The vegetation hanger according to claim 1, further comprising a base defined by the bent portion of the second edge of the linear plate.

10. A vegetation hanger, comprising:
    a linear plate of a crossbar having a first edge, a second edge, a first end portion, and a second end portion; and
    an aperture disposed along the linear plate and configured to slidably engage with a bar,
    wherein the linear plate further comprises a protrusion including a first edge, a top edge, and a bottom edge, wherein the first edge of the protrusion extends beyond the first edge of the linear plate, and wherein the aperture is defined within the protrusion,
    wherein a portion of the second edge of the linear plate is bent at a predetermined angle relative to the crossbar, and wherein the bent portion of the second edge extends along an entire length of the crossbar between the first end portion and the second end portion.

11. The vegetation hanger according to claim 10, wherein:
    the aperture is centrally located between the first edge of the protrusion and the second edge of the linear plate.

12. The vegetation hanger according to claim 10, wherein the first edge is a serrated surface disposed along a topmost surface of the crossbar that is configured to facilitate stationary hanging and organization of vegetation on the crossbar which includes a plurality of ridges disposed along the first edge upon which is configured for the hanging of vegetation.

13. The vegetation hanger according to claim 10, wherein predetermined angle is 90 degrees.

14. The vegetation hanger according to claim 10, wherein the first and second end portions of the linear plate each includes a lip.

15. The vegetation hanger according to claim 10, wherein the linear plate is tapered from a center point between the first and second end portions outwardly towards the first and second end portions.

16. The vegetation hanger according to claim 10, further comprising a base defined by the bent portion of the second edge of the linear plate.

* * * * *